(12) United States Patent
Cariou et al.

(10) Patent No.: US 11,251,837 B2
(45) Date of Patent: Feb. 15, 2022

(54) NULL DATA PACKET FEEDBACK REPORT FOR WIRELESS COMMUNICATIONS

(71) Applicant: Intel Corporation, Santa Clara, CA (US)

(72) Inventors: Laurent Cariou, Portland, OR (US); Daniel Bravo, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 272 days.

(21) Appl. No.: 16/196,392

(22) Filed: Nov. 20, 2018

(65) Prior Publication Data
US 2019/0089424 A1 Mar. 21, 2019

Related U.S. Application Data

(60) Provisional application No. 62/588,772, filed on Nov. 20, 2017.

(51) Int. Cl.
| | | |
|---|---|---|
| *H04W 72/04* | (2009.01) | |
| *H04B 7/0417* | (2017.01) | |
| *H04W 24/10* | (2009.01) | |
| *H04W 74/06* | (2009.01) | |
| *H04W 74/08* | (2009.01) | |
| *H04W 74/00* | (2009.01) | |
| *H04L 5/00* | (2006.01) | |

(52) U.S. Cl.
CPC .......... *H04B 7/0417* (2013.01); *H04W 24/10* (2013.01); *H04W 72/0446* (2013.01); *H04W 74/06* (2013.01); *H04L 5/0094* (2013.01); *H04W 74/006* (2013.01); *H04W 74/08* (2013.01)

(58) Field of Classification Search
None
See application file for complete search history.

(56) References Cited

U.S. PATENT DOCUMENTS

| | | | |
|---|---|---|---|
| 10,641,887 B1 * | 5/2020 | Chu | H04W 40/02 |
| 2019/0041509 A1 * | 2/2019 | Jiang | H04W 24/10 |
| 2020/0029236 A1 * | 1/2020 | Segev | H04W 88/06 |
| 2020/0029324 A1 * | 1/2020 | Nezou | H04W 72/0413 |
| 2020/0256975 A1 * | 8/2020 | Chu | H04W 40/02 |
| 2021/0084635 A1 * | 3/2021 | Oteri | H04W 72/044 |

* cited by examiner

*Primary Examiner* — Kodzovi Acolatse
(74) *Attorney, Agent, or Firm* — Eversheds Sutherland (US) LLP

(57) ABSTRACT

This disclosure describes systems, methods, and devices related to null data packet (NDP) feedback report. A device may cause to send an NDP feedback report frame to one or more station devices, wherein the NDP feedback report frame comprises one or more resource allocations. The device may identify an allocation response using a first allocation of the one or more resource allocations from a first station device. The device may determine to assign one or more timeslots as contention based resources based on the allocation response.

20 Claims, 6 Drawing Sheets

NULL DATA PACKET FEEDBACK REPORT FOR WIRELESS COMMUNICATIONS

CROSS-REFERENCE TO RELATED APPLICATION(S)

This application claims the benefit of U.S. Provisional Application No. 62/588,772, filed Nov. 20, 2017, the disclosure of which is incorporated herein by reference as if set forth in full.

TECHNICAL FIELD

This disclosure generally relates to systems and methods for wireless communications and, more particularly, to null data packet (NDP) feedback report.

BACKGROUND

Wireless devices are becoming widely prevalent and are increasingly requesting access to wireless channels. A next generation Wi-Fi is under development. The next generation Wi-Fi utilizes Orthogonal Frequency-Division Multiple Access (OFDMA) in channel allocation.

DETAILED DESCRIPTION

Figure 1:
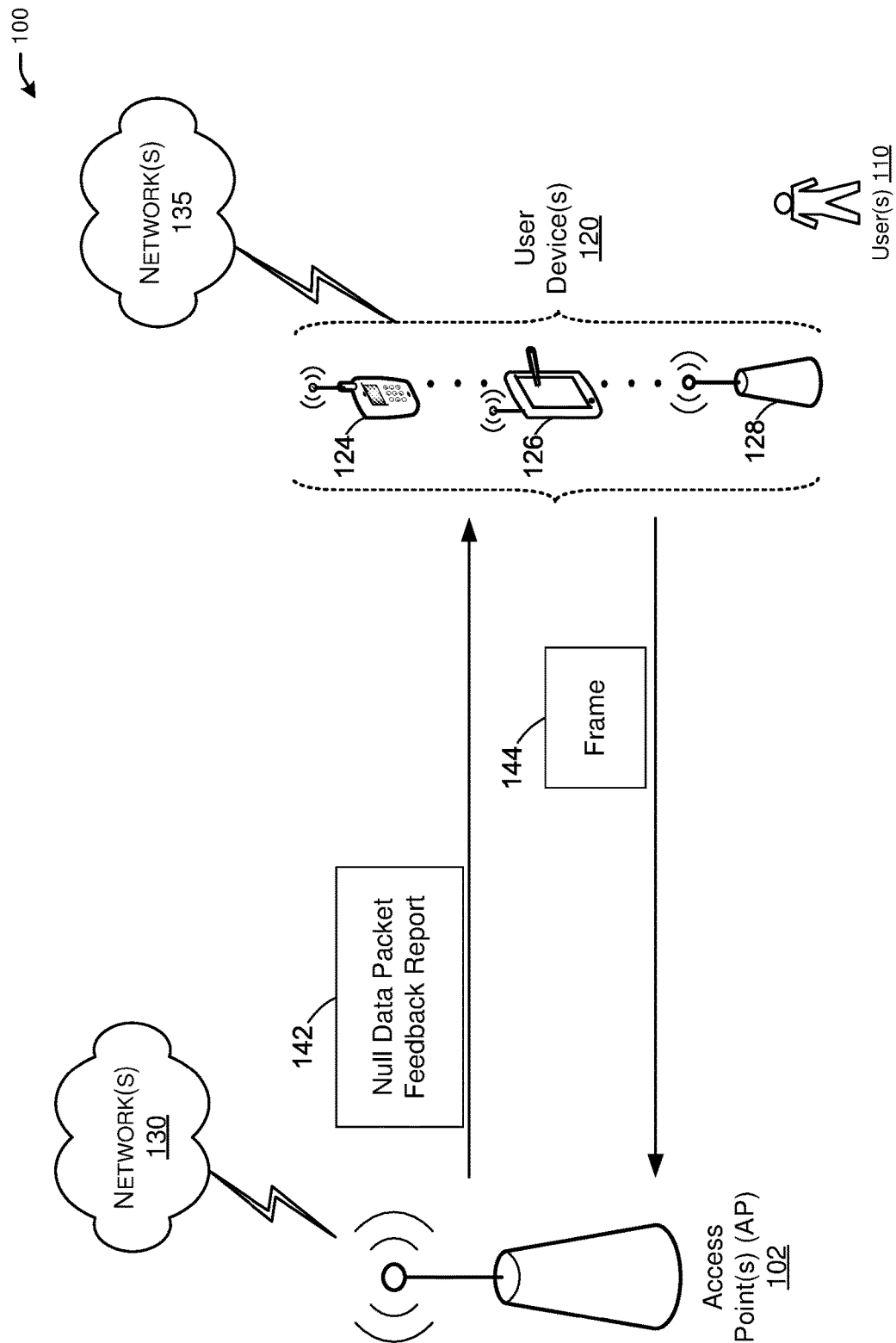
FIG. 1 depicts a network diagram illustrating an example network environment for null data packet (NDP) feedback report, in accordance with one or more example embodiments of the present disclosure.

Example embodiments described herein provide certain systems, methods, and devices for null data packet (NDP) feedback report. The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

IEEE 802.11ax is defining a mechanism called NDP feedback report. This method allows the access point (AP) to trigger very short response from a very large number of station devices (STAs). The STAs respond to the trigger in uplink (UL) multi-user (MU) mode, transmitting only the physical layer (PHY) preamble (no data payload) using orthogonal allocation that is designed in the high-efficiency long training field (LTF) in the PHY preamble. The AP can perform energy or sequence detection on each of these allocations to identify who sent the feedback (allocation ID) and what the feedback (energy/sequence detection) is. An example of application is the AP asking in the trigger who wants to transmit (resource request), and the STAs responding yes or no with the short feedback.

Currently NDP feedback report does not allow unassociated STAs to make a resource request and access the medium. For example, it does not provide an opportunity for unassociated STAs to make a resource request and to make requests for asking for a probe response. Enhanced distributed channel access (EDCA) is the current mechanism for an unassociated STA to access the medium. However, in very dense environments, the latency to access the medium with EDCA can be very large because APs are getting the channel most of the time and there should be a way for an AP to facilitate unassociated STA access. An AP could do this in the simplest way by leaving contention time for EDCA or by implementing a more complex solution like a triggered contention period for a limited set of STAs. But, to execute any of these solutions, the AP needs to know that some unassociated STAs are currently trying to access the medium.

Example embodiments of the present disclosure relate to systems, methods, and devices for NDP feedback report.

In one or more embodiments, an NDP feedback report system may define the way for unassociated STAs to signal to the AP that they are trying to access the medium by using the NDP feedback report mechanism.

In one or more embodiments, an NDP feedback report system may enable unassociated STAs to send a resource request for EDCA contention time with the NDP feedback report protocol.

In one embodiment, an NDP feedback report system may modify the NDP feedback report protocol so that there can be one or more allocations that can be used by unassociated STAs to signal to the AP that they are trying to access the medium with EDCA.

Currently, the NDP feedback report trigger frame provides all of the information so that associated STAs can know how many allocations are available and what allocation they can use based on the range of association identifications (AIDs) that are indicated.

In one embodiment, an NDP feedback report system may determine that the number of allocations available for current operation is equal to the current total number of allocations minus the number of allocations reserved for unassociated STAs for EDCA access request. Similarly, the range of AIDs calculation is modified to take into account the reduced number of allocations (because some are reserved for unassociated STAs).

The NDP feedback report trigger frame should be modified to indicate the presence of this allocation (and the number of such allocations). If this allocation or these allocations are always present, the trigger frame does not need to be modified.

In one or more embodiments, unassociated STAs that receive the NDP feedback report may derive the allocation(s) on which they can transmit energy in order to indicate to the AP that they are currently trying to access the medium with EDCA to send pre-association frames.

In one or more embodiments, if there is a single allocation available, all unassociated STAs that want to respond will use the same allocation to send energy. Energy will add and the AP will see that at least one unassociated STA made a request, but will not know how many STAs did a request. That is, since multiple STAs use the same allocation, the AP will detect that the energy received on that allocation is greater than a threshold indicating to the AP that there are more than one STAs using that same allocation.

In one or more embodiments, if there are multiple allocations available, unassociated STA will randomly select one of the allocations and transmit energy on the selected allocation. The AP will then get more information on the number of STAs that made the request. This information may be based on the number of resources used by the unassociated STAs that sent energy on the selected allocations.

In one or more embodiments, following a request for channel access, the AP may intentionally leave some contention time to give these unassociated STAs more chances to get access to the medium with EDCA. However, with this approach it is not guaranteed that all of the unassociated STAs will get enough time to transmit their data.

In one or more embodiments, following a request for channel access, the AP may assign one or more uplink resource allocations to be used by the associated devices, but also the AP may schedule a contention period that is reserved for the STAs that made the request. The contention period may be estimated based on the number of STAs that made the request. Also, this contention period may be estimated based on available resources that remain after servicing the associated STAs. The AP may notify the associated and the unassociated devices by sending a trigger frame that comprises the one or more uplink resource allocations. The trigger frame may have a flag that is set in one of its fields to indicate that this trigger frame contains resource allocations.

The solution improves the chances for unassociated STAs to access the medium to send pre-association frames.

The above descriptions are for purposes of illustration and are not meant to be limiting. Numerous other examples, configurations, processes, etc., may exist, some of which are described in greater detail below. Example embodiments will now be described with reference to the accompanying figures.

FIG. 1 is a network diagram illustrating an example network environment of NDP feedback report, according to some example embodiments of the present disclosure. Wireless network 100 may include one or more user devices 120 and one or more access points (AP) 102, which may communicate in accordance with IEEE 802.11 communication standards. The user device(s) 120 may be mobile devices that are non-stationary (e.g., not having fixed locations) or may be stationary devices.

Figure 5:
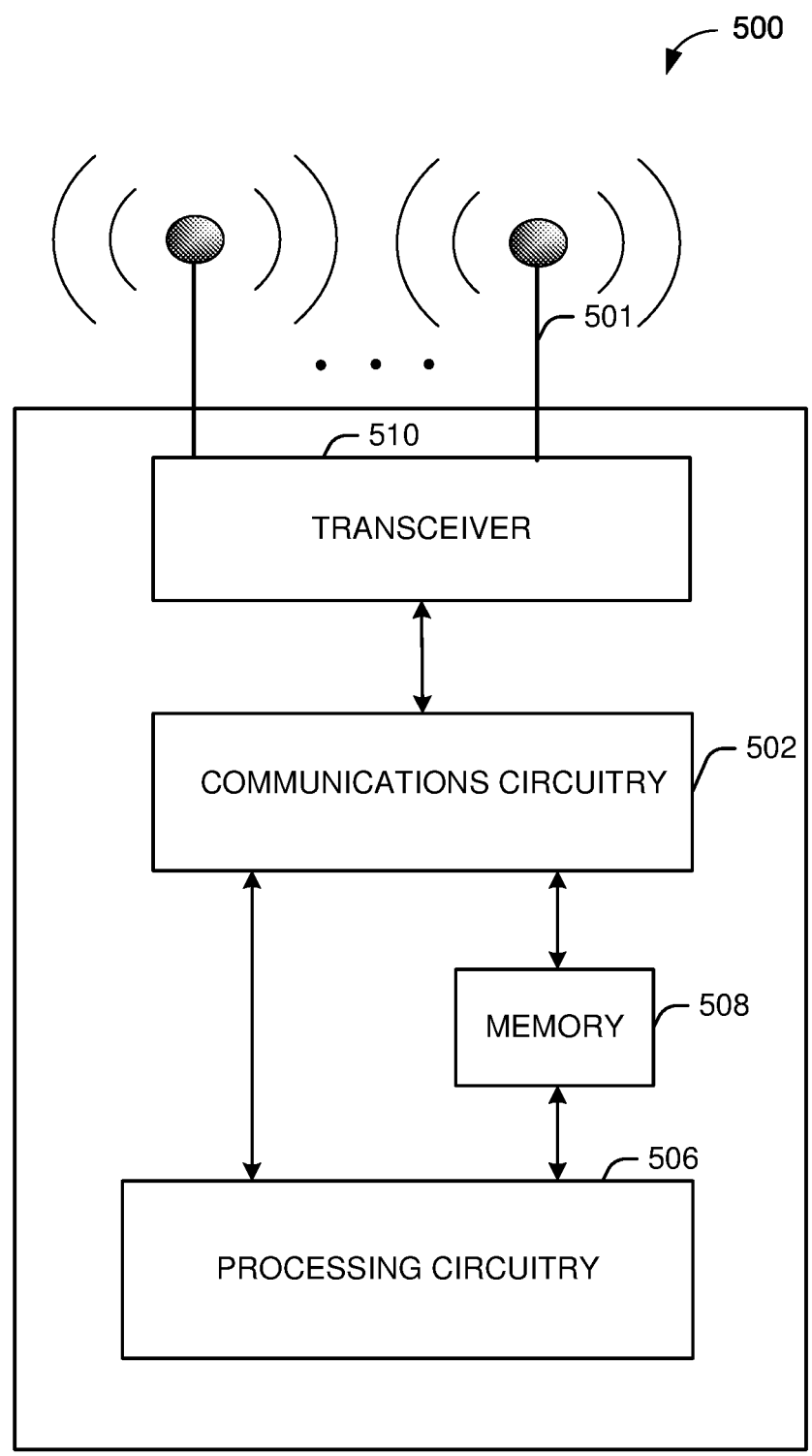
FIG. 5 depicts an illustrative functional diagram of an exemplary communication station that may be suitable for use as a user device, in accordance with one or more example embodiments of the present disclosure.
Figure 6:
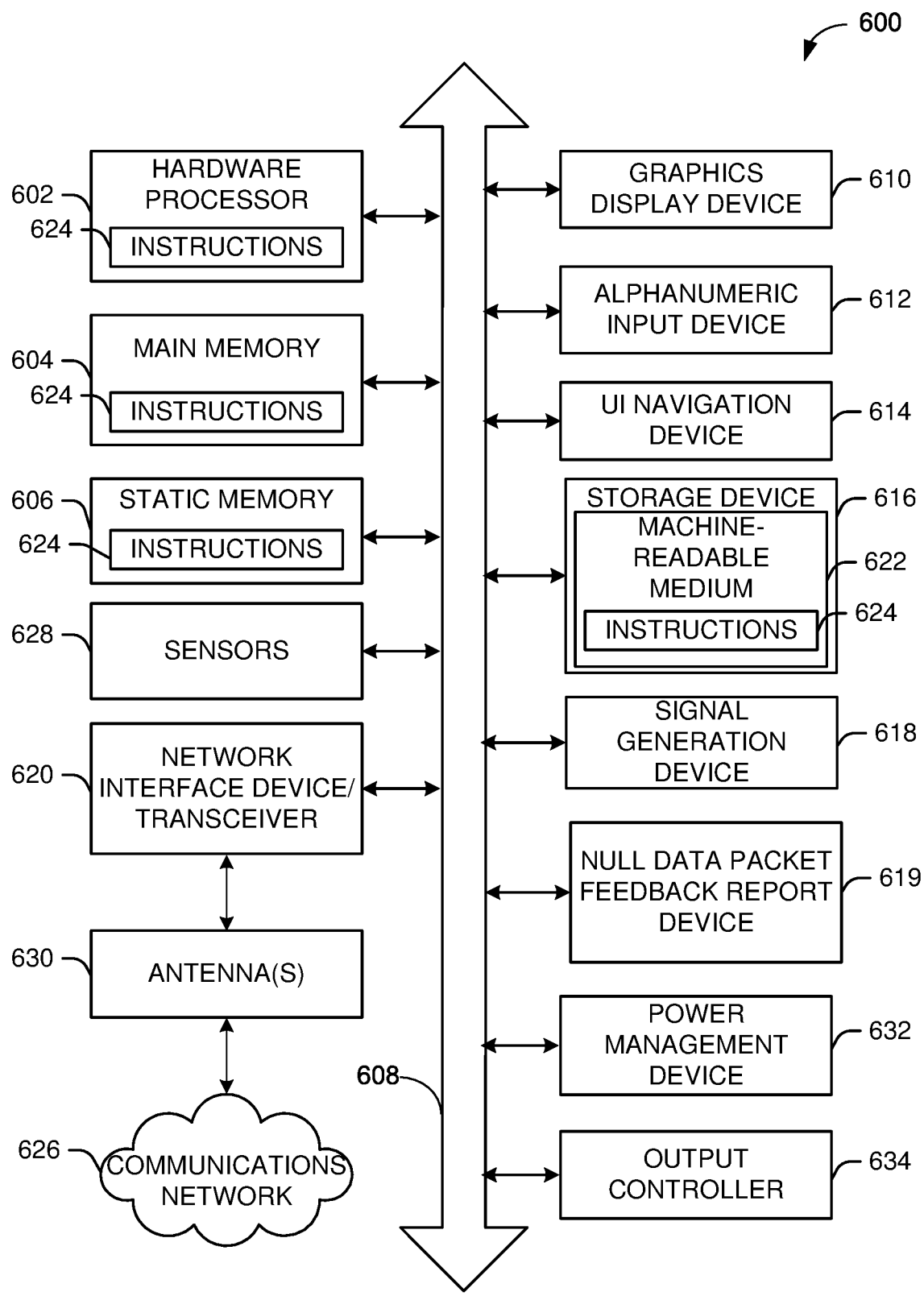
FIG. 6 depicts an illustrative block diagram of an example machine upon which any of one or more techniques (e.g., methods) may be performed, in accordance with one or more example embodiments of the present disclosure.

In some embodiments, the user devices 120 and the AP 102 may include one or more computer systems similar to that of the functional diagram of FIG. 5 and/or the example machine/system of FIG. 6.

One or more illustrative user device(s) 120 and/or AP(s) 102 may be operable by one or more user(s) 110. It should be noted that any addressable unit may be a station (STA). An STA may take on multiple distinct characteristics, each of which shapes its function. For example, a single addressable unit might simultaneously be a portable STA, a quality-of-service (QoS) STA, a dependent STA, and a hidden STA. The one or more illustrative user device(s) 120 and the AP(s) 102 may be STAs. The one or more illustrative user device(s) 120 and/or AP(s) 102 may operate as a personal basic service set (PBSS) control point/access point (PCP/AP). The user device(s) 120 (e.g., 124, 126, or 128) and/or AP(s) 102 may include any suitable processor-driven device, including, but not limited to, a mobile device or a non-mobile, e.g., a static, device. For example, user device(s) 120 and/or AP(s) 102 may include a user equipment (UE), a station (STA), an access point (AP), a software enabled AP (SoftAP), a personal computer (PC), a wearable wireless device (e.g., bracelet, watch, glasses, ring), a desktop computer, a mobile computer, a laptop computer, an Ultrabook™ computer, a notebook computer, a tablet computer, a server computer, a handheld computer, a handheld device, an Internet of Things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small, live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a Blu-ray disc (BD) player, a BD recorder, a digital video disc (DVD) player, a high definition (HD) DVD player, a DVD recorder, an HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc., may also be included in this list.

As used herein, the term "Internet of Things (IoT) device" is used to refer to any object (e.g., an appliance, a sensor) that has an addressable interface (e.g., an Internet protocol (IP) address, a Bluetooth identifier (ID), a near-field communication (NFC) ID) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may comprise a combination of "legacy" Internet-accessible devices (e.g., laptop or desktop computers, cell phones) in addition to devices that do not typically have Internet connectivity (e.g., dishwashers).

The user device(s) 120 and/or AP(s) 102 may also include mesh stations in, for example, a mesh network, in accordance with one or more IEEE 802.11 standards and/or 3GPP standards.

Any of the user device(s) 120 (e.g., user devices 124, 126, 128), and AP(s) 102 may be configured to communicate with each other via one or more communications networks 130 and/or 135 wirelessly or wired. The user device(s) 120 may also communicate peer to peer or directly with each other with or without the AP(s) 102. Any of the communications networks 130 and/or 135 may include, but are not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried, including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128) and AP(s) 102 may include one or more communications antennas. The one or more communications antennas may be any suitable type of antennas corresponding to the communications protocols used by the user device(s) 120 (e.g., user devices 124, 126, 128), and AP(s) 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 120 and/or AP(s) 102.

Any of the user device(s) 120 (e.g., user devices 124, 126, 128) and AP(s) 102 may be configured to perform directional transmission and/or directional reception in conjunction with wirelessly communicating in a wireless network. Any of the user device(s) 120 (e.g., user devices 124, 126, 128) and AP(s) 102 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 120 (e.g., user devices 124, 126, 128) and AP(s) 102 may be configured to perform any given directional transmission toward one or more defined transmit sectors. Any of the user device(s) 120 (e.g., user devices 124, 126, 128) and AP(s) 102 may be configured to perform any given directional reception from one or more defined receive sectors.

MIMO beamforming in a wireless network may be accomplished using RF beamforming and/or digital beamforming. In some embodiments, in performing a given MIMO transmission, user devices 120 and/or AP(s) 102 may be configured to use all or a subset of its one or more communications antennas to perform MIMO beamforming.

Any of the user devices 120 (e.g., user devices 124, 126, 128) and AP(s) 102 may include any suitable radio and/or transceiver for transmitting and/or receiving radio frequency (RF) signals in the bandwidth and/or channels corresponding to the communications protocols utilized by any of the user device(s) 120 and AP(s) 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g., 802.11b, 802.11g, 802.11n, 802.11ax), 5 GHz channels (e.g., 802.11n, 802.11ac, 802.11ax), or 60 GHz channels (e.g., 802.11ad, 802.11ay). In some embodiments, non-Wi-Fi protocols may be used for communications between devices, such as Bluetooth, dedicated short-range communication (DSRC), ultra-high frequency (UHF) (e.g., IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

In one embodiment, an AP 102 may send an NDP feedback report 142 to one or more user device(s) 120 that may include devices that are associated or unassociated with the AP 102. Unassociated user devices 120 that receive the NDP feedback report 142 may derive the allocation(s) on which they can transmit energy (e.g., frame 144) in order to indicate to the AP that they are currently trying to access the medium with EDCA to send pre-association frames. It is understood that the above descriptions are for purposes of illustration and are not meant to be limiting.

Figure 2:
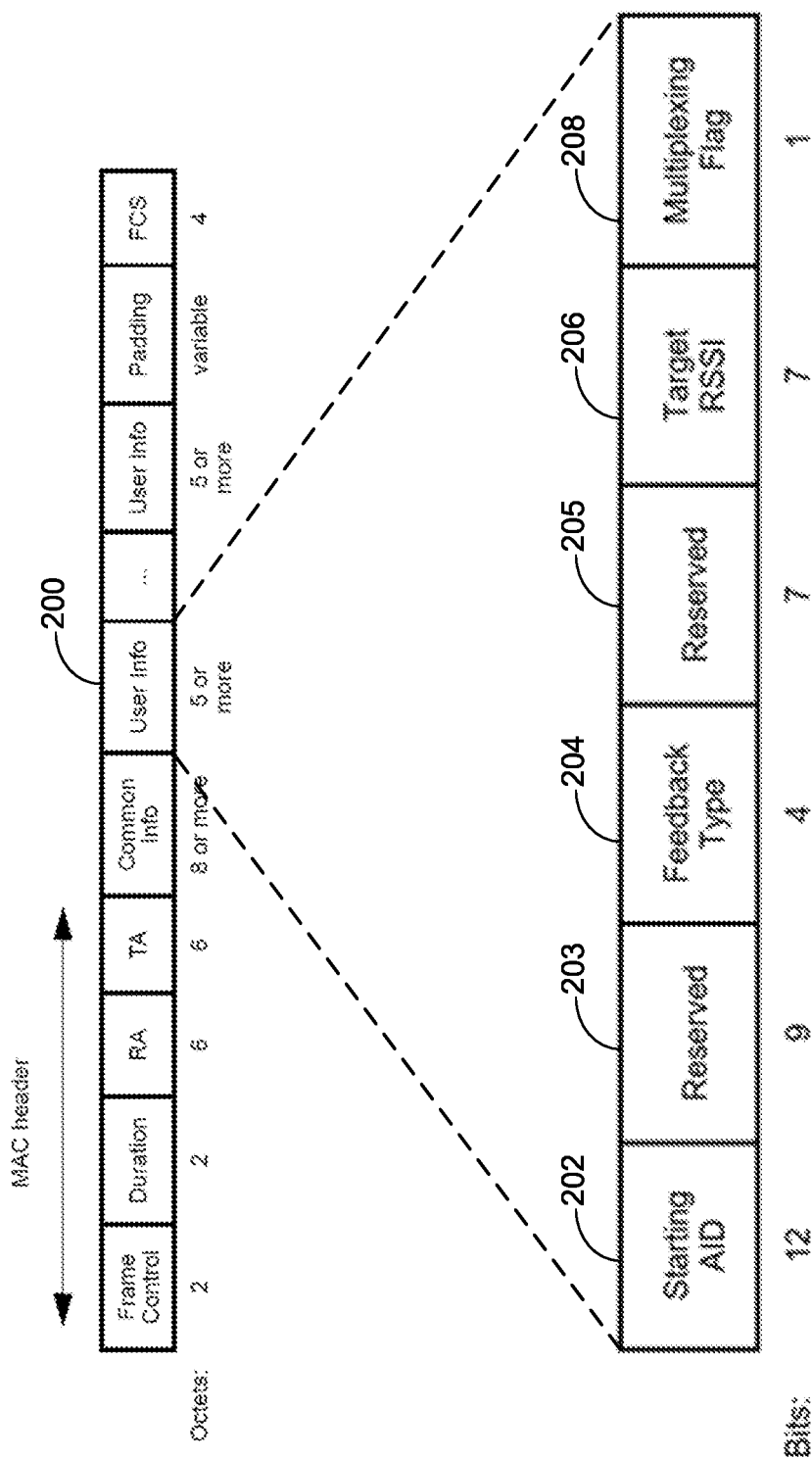
FIG. 2 depicts an illustrative schematic diagram for a user information field of an NDP feedback report poll (NFRP) trigger frame.

FIG. 2 depicts an illustrative schematic diagram for a user information field 200 of an NDP feedback report poll (NFRP) trigger frame.

The 802.11 currently defines a new trigger type, called NFRP, and the procedure to enable associated STAs to be triggered and send a feedback. This NFRP is meant for polling the associated STAs if they would like to be scheduled for uplink data. The trigger frame may comprise a field that may be set to a certain value to indicate that the trigger frame is an NFRP trigger frame. The associated STAs know that they are scheduled to respond to the poll request of the NFRP trigger frame and derive their allocation parameters by reading the parameters in the NFRP trigger frame, and by using their AID, which is an identifier that is given to them at association. The user information field 200 comprises one or more fields. For example, the user information field 200 includes a starting AID 202, a reserved field 203, a feedback type field 204, another reserved field 205, a target received signal strength indicator (RSSI) field 206, and a multiplexing flag 208.

The Starting AID field 202 defines the first association identification (AID) of the range of AIDs that are scheduled to respond to the NFRP trigger frame. These AIDs are for STAs that are associated with the AP. The Target RSSI field 206 indicates the target received signal power of the NDP feedback report response for all scheduled STAs. The multiplexing flag field 208 indicates the number of STAs that are multiplexed with P-matrix codes on the same set of tones in the same RU, and is encoded as the number of STAs minus 1.

According to the 802.11 standard, an STA may set the NDP Feedback Report Support subfield in a capabilities element (e.g., the HE Capabilities element) to 1 if it supports NDP feedback report and set it 0, otherwise.

An STA may not transmit an NDP feedback report response, in response to an NFRP trigger frame, unless it is explicitly enabled by an AP in one of the operation modes. The inter-frame space between a frame (e.g., a PPDU) that contains an NDP feedback report poll trigger frame and the NDP feedback report poll response is short inter-frame space (SIFS). An STA may start the transmission of an NDP feedback report response at the SIFS time boundary after the end of a received PPDU, such as a trigger frame that is indicated as an NDP feedback report poll trigger frame. The STA may start the transmission of a response when all of the following conditions are met:

The received PPDU contains an NDP feedback report poll trigger frame.

The STA is scheduled by the NDP feedback report poll trigger frame.

The NDP feedback report support subfield in HE MAC Capabilities Information field is set to 1.

The STA intends to provide a response to the type of the NDP feedback contained in the NDP Feedback Report Poll Trigger frame.

If an STA does not satisfy all of the above conditions, it is not required to respond to the NDP Feedback Report Poll Trigger frame.

An STA is scheduled to respond to the NDP feedback report poll trigger frame if its AID is greater than or equal to the starting AID and less than starting AID+$N_{STA}$, using the Starting AID subfield in the eliciting Trigger frame, and with $N_{STA}$ the total number of STAs that are scheduled to respond to the NDP feedback report poll trigger frame. $N_{STA}$ is calculated by the following equation, with BW subfield and Multiplexing Flag subfield from the eliciting Trigger frame: $N_{STA}=18\times2^{BW}\times$(Multiplexing Flag), where BW is the value indicated in the BW subfield of the NDP feedback report poll trigger frame, and Multiplexing Flag is the value indicated in the multiplexing Flag subfield of the NDP feedback report poll trigger frame.

Figure 3:
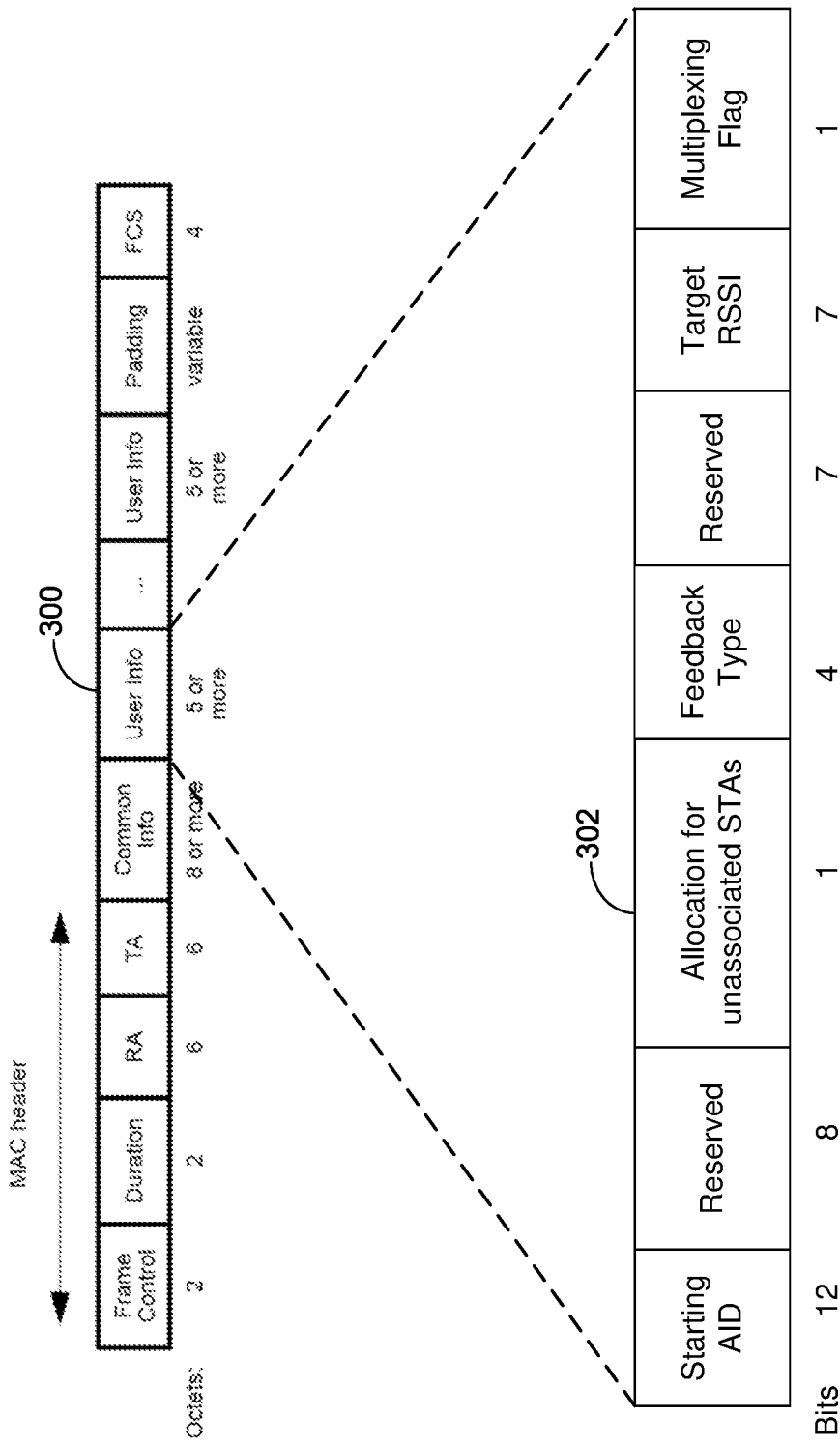
FIG. 3 depicts an illustrative schematic diagram for a user information field of an enhanced NFRP trigger frame, in accordance with one or more example embodiments of the present disclosure.

FIG. 3 depicts an illustrative schematic diagram for a user information field 300 of an enhance NFRP trigger frame, in accordance with one or more example embodiments of the present disclosure.

Referring to FIG. 3, there is shown an enhanced NDP feedback report poll (NFRP).

As discussed, either the allocation is always present, or its presence is signaled in the trigger frame with a specific flag. This field can be bigger to indicate not a single but multiple allocations for unassociated STAs. For example, a reserved field may be apportioned to include a flag (e.g., allocation for unassociated STAs 302). This flag may be used in the enhanced NFRP trigger frame to indicate to STAs (associated or unassociated STAs) that receive this trigger frame that there are one or more allocations that can be used for unassociated STAs in order to send a feedback response to the poll request of the NFRP trigger frame.

In one embodiment, an NDP feedback report system may facilitate change in the calculation of the total number of scheduled STAs:

The total number of STAs, $N_{STA}$, that are scheduled to respond to the NDP Feedback Report Poll Trigger frame may be calculated using (9-ax1): N:

(9-ax1): $N_{STA}=18\times2^{BW}\times$(Multiplexing Flag)–a number of allocations for unassociated STAs;

Where BW is the value indicated in the BW subfield of the NDP Feedback Report Poll Trigger frame, Multiplexing Flag is the value indicated in the Multiplexing Flag subfield of the NDP Feedback Report Poll Trigger frame.

In one or more embodiments, to minimize the changes to the 802.11 specification, the allocations for unassociated STAs may be at the end of the allocations. For example, if there are 80 allocations, and 2 allocations for unassociated STAs, the 2 last allocations (79 and 80) will be assigned to unassociated STAs.

In one or more embodiments, it is also possible to extend this request for EDCA access with this single overlapping request from one or multiple unassociated STAs to other use cases, such as a request to receive a probe response from the AP, in response to or right after the NDP feedback report procedure. Unassociated STAs may send energy on the right allocation to make a request to receive a broadcasted probe response. If the 2 use cases are present, meaning that we have both:

1) One or multiple allocations reserved for unassociated STAs to indicate that they intend to access the medium with EDCA; and 2) One or multiple allocations reserved for unassociated STAs to indicate that they want to receive a probe response from the AP.

Then those allocations may be non-overlapping and at the end of the range of allocation IDs. An unassociated STA may send energy on one of the 2 sets of allocations or on the 2 sets of allocations.

It is understood that the above descriptions are for purposes of illustration and are not meant to be limiting.

Figure 4:
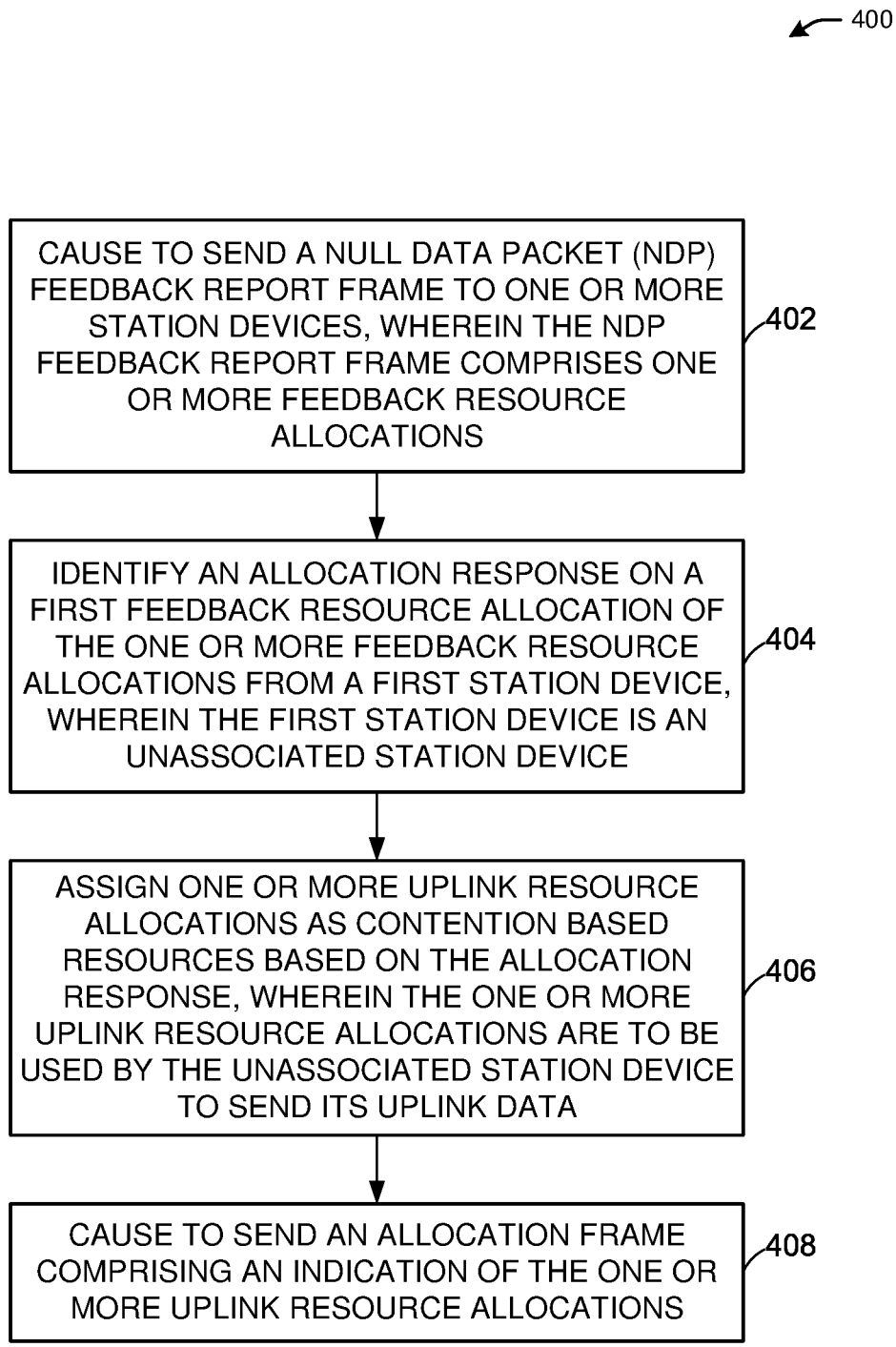
FIG. 4 depicts an illustrative flow diagram of illustrative process for an NDP feedback report system, in accordance with one or more example embodiments of the present disclosure.

FIG. 4 illustrates a flow diagram of illustrative process 400 for an illustrative NDP feedback report system, in accordance with one or more example embodiments of the present disclosure.

At block 402, a device (e.g., the user device(s) 120 and/or the AP 102 of FIG. 1) may cause to send a null data packet (NDP) feedback report frame to one or more station devices, wherein the NDP feedback report frame comprises one or more feedback resource allocations. The NDP feedback report frame may be a trigger frame comprising a setting to indicate a polling type. For example, the trigger frame may be an NDP feedback report poll (NFRP) trigger frame. This NFRP is meant for polling the associated STAs if they would like to be scheduled for uplink data. The trigger frame may comprise a field that may be set to a certain value to indicate that the trigger frame is an NFRP trigger frame. Allocations presence is signaled in the trigger frame with a specific flag in a field. This field can be bigger to indicate not a single but multiple allocations for unassociated STAs. For example, a reserved field may be apportioned to include a flag. This flag may be used in the enhanced NFRP trigger frame to indicate to STAs (associated or unassociated STAs) that receive this trigger frame that there are one or more allocations that can be used for unassociated STAs in order to send a feedback response to the poll request of the NFRP trigger frame.

At block 404, the device may identify an allocation response on a first feedback resource allocation of the one or more feedback resource allocations from a first station device, wherein the first station device is an unassociated station device. The allocation response is an energy transmitted on the first feedback resource allocation.

At block 406, the device may assign one or more uplink resource allocations as contention based resources based on the allocation response, wherein the one or more uplink resource allocations are to be used by the unassociated station device to send its uplink data.

At block 408, the device may cause to send an allocation frame comprising an indication of the one or more uplink resource allocations. The allocation frame may be a trigger frame comprising a setting to indicate an allocation trigger frame. The one or more uplink resource allocations may be accessed using enhanced distributed channel access (EDCA). In some example, the AP may identify a second allocation response, wherein the second allocation response is detected as a second energy on the first feedback resource allocation, wherein the first energy and the second energy are added together as a resulting energy on the first feedback resource allocation. In that case the AP may assign the one or more resource allocations based on the resulting energy on the resource allocation. Also, the AP may determine to assign resource allocations to unassociated station devices at the end of the one or more uplink resource allocations.

It is understood that the above descriptions are for purposes of illustration and are not meant to be limiting.

FIG. 5 shows a functional diagram of an exemplary communication station 500 in accordance with some embodiments. In one embodiment, FIG. 5 illustrates a functional block diagram of a communication station that may be suitable for use as an AP 102 (FIG. 1) or user device 120 (FIG. 1) in accordance with some embodiments. The communication station 500 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 500 may include communications circuitry 502 and a transceiver 510 for transmitting and receiving signals to and from other communication stations using one or more antennas 501. The transceiver 510 may be a device comprising both a transmitter and a receiver that are combined and share common circuitry (e.g., communications circuitry 502). The communications circuitry 502 may include amplifiers, filters, mixers, analog to digital and/or digital to analog converters. The transceiver 510 may transmit and receive analog or digital signals. The transceiver 510 may allow reception of signals during transmission periods. This mode is known as full-duplex, and may require the transmitter and receiver to operate on different frequencies to minimize interference between the transmitted signal and the received signal. The transceiver 510 may operate in a half-duplex mode, where the transceiver 510 may transmit or receive signals in one direction at a time.

The communications circuitry 502 may include circuitry that can operate the physical layer (PHY) communications and/or media access control (MAC) communications for controlling access to the wireless medium, and/or any other communications layers for transmitting and receiving signals. The communication station 500 may also include processing circuitry 506 and memory 508 arranged to perform the operations described herein. In some embodiments, the communications circuitry 502 and the processing circuitry 506 may be configured to perform operations detailed in FIGS. 1-4.

In accordance with some embodiments, the communications circuitry 502 may be arranged to contend for a wireless medium and configure frames or packets for communicating over the wireless medium. The communications circuitry 502 may be arranged to transmit and receive signals. The communications circuitry 502 may also include circuitry for modulation/demodulation, upconversion/downconversion, filtering, amplification, etc. In some embodiments, the processing circuitry 506 of the communication station 500 may include one or more processors. In other embodiments, two or more antennas 501 may be coupled to the communications circuitry 502 arranged for sending and receiving signals. The memory 508 may store information for configuring the processing circuitry 506 to perform operations for configuring and transmitting message frames and performing the various operations described herein. The memory 508 may include any type of memory, including non-transitory memory, for storing information in a form readable by a machine (e.g., a computer). For example, the memory 508 may include a computer-readable storage device, read-only memory (ROM), random-access memory (RAM), magnetic disk storage media, optical storage media, flash-memory devices, and other storage devices and media.

In some embodiments, the communication station 500 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor), a wearable computer device, or another device that may receive and/or transmit information wirelessly.

In some embodiments, the communication station 500 may include one or more antennas 501. The antennas 501 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 500 may include one or more of a keyboard, a display, a non-volatile memory port, multiple antennas, a graphics processor, an application processor, speakers, and other mobile device elements. The display may be an LCD screen, including a touch screen.

Although the communication station 500 is illustrated as having several separate functional elements, two or more of the functional elements may be combined and may be implemented by combinations of software-configured elements, such as processing elements, including digital signal processors (DSPs), and/or other hardware elements. For example, some elements may include one or more microprocessors, DSPs, field-programmable gate arrays (FPGAs), application-specific integrated circuits (ASICs), radio-frequency integrated circuits (RFICs), and combinations of various hardware and logic circuitry for performing at least the functions described herein. In some embodiments, the functional elements of the communication station 500 may refer to one or more processes operating on one or more processing elements.

Certain embodiments may be implemented in one, or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 500 may include one or more processors and may be configured with instructions stored on a computer-readable storage device memory.

FIG. 6 illustrates a block diagram of an example of a machine 600 or system upon which any one or more of the techniques (e.g., methodologies) discussed herein may be performed. In other embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environments. The machine 600 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits) and a computer-readable medium containing instructions where the instructions configure the execution units to carry out a specific operation when in operation. The configuring may occur under the direction of the execution units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a power management device 632, a graphics display device 610, an alphanumeric input device 612 (e.g., a keyboard), and a user interface (UI) navigation device 614 (e.g., a mouse). In an example, the graphics display device 610, alphanumeric input device 612, and UI navigation device 614 may be a touch screen display. The machine 600 may additionally include a storage device (i.e., drive unit) 616, a signal generation device 618 (e.g., a speaker), an NDP feedback report device 619, a network interface device/transceiver 620 coupled to antenna(s) 630, and one or more sensors 628, such as a global positioning system (GPS) sensor, a compass, an accelerometer, or other sensor. The machine 600 may include an output controller 634, such as a serial (e.g., universal serial bus (USB), parallel, or other wired or wireless (e.g., infrared (IR), near field communication (NFC)) connection to communicate with or control one or more peripheral devices (e.g., a printer, a card reader).

The storage device 616 may include a machine-readable medium 622 on which is stored one or more sets of data structures or instructions 624 (e.g., software) embodying or utilized by any one or more of the techniques or functions described herein. The instructions 624 may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 616 may constitute machine-readable media.

The NDP feedback report device 619 may carry out or perform any of the operations and processes (e.g., process 400) described and shown above.

It is understood that the above are only a subset of what the NDP feedback report device 619 may be configured to perform and that other functions included throughout this disclosure may also be performed by the NDP feedback report device 619. For example, the NDP feedback report device 619 may define the way for unassociated STAs to signal to the AP that they are trying to access the medium by using the NDP feedback report mechanism.

The NDP feedback report device 619 may enable unassociated STAs to send a resource request for EDCA contention time with the NDP feedback report protocol.

The NDP feedback report device 619 may modify the NDP feedback report protocol so that there can be one or more allocations that can be used by unassociated STAs to signal to the AP that they are trying to access the medium with EDCA. Currently, the NDP feedback report trigger frame provides all of the information so that associated STAs can know how many allocations are available and what allocation they can use based on the range of association identifications (AIDs) that are indicated.

The NDP feedback report device 619 may determine that the number of allocations available for current operation is equal to the current total number of allocations minus the number of allocations reserved for unassociated STAs for EDCA access request. Similarly, the range of AIDs calculation is modified to take into account the reduced number of allocations (because some are reserved for unassociated STAs).

The NDP feedback report device 619 may be modified to indicate the presence of this allocation (and the number of such allocations). If this allocation or these allocations are always present, the trigger frame does not need to be modified.

The NDP feedback report device 619 may facilitate that unassociated STAs that receive the NDP feedback report may derive the allocation(s) on which they can transmit energy in order to indicate to the AP that they are currently trying to access the medium with EDCA to send pre-association frames. If there is a single allocation available, all unassociated STAs that want to respond will use the same allocation to send energy. Energy will add and the AP will see that at least one unassociated STA made a request, but will not know how many STAs did a request. That is, since multiple STAs use the same allocation, the AP will detect that the energy received on that allocation is greater than a threshold indicating to the AP that there are more than one STAs using that same allocation. If there are multiple allocations available, unassociated STA will randomly select one of the allocations and transmit energy on the selected allocation. The AP will then get more information on the number of STAs that made the request. This information may be based on the number of resources used by the unassociated STAs that sent energy on the selected allocations.

The NDP feedback report device 619 may facilitate that following a request for channel access, the AP may intentionally leave some contention time to give these unassociated STAs more chances to get access to the medium with EDCA. However, with this approach it is not guaranteed that all of the unassociated STAs will get enough time to transmit their data.

The NDP feedback report device 619 may facilitate that following a request for channel access, the AP may schedule a contention period that is reserved for the STAs that made the request. The contention period may be estimated based on the number of STAs that made the request. Also, this contention period may be estimated based on available resources that remain after servicing the associated STAs.

While the machine-readable medium 622 is illustrated as a single medium, the term "machine-readable medium" may include a single medium or multiple media (e.g., a centralized or distributed database, and/or associated caches and servers) configured to store the one or more instructions 624.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read-only memory (ROM); random-access memory (RAM); magnetic disk storage media; optical storage media; a flash memory, etc.

The term "machine-readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device/transceiver 620 utilizing any one of a number of transfer protocols (e.g., frame relay, internet protocol (IP), transmission control protocol (TCP), user datagram protocol (UDP), hypertext transfer protocol (HTTP)). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 620 may include one or more physical jacks (e.g., Ethernet, coaxial, or phone jacks) or one or more antennas to connect to the communications network 626. In an example, the network interface device/transceiver 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refer to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one-way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple-input multiple-output (MIMO) transceiver or device, a single-input multiple-output (SIMO) transceiver or device, a multiple-input single-output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

The following examples pertain to further embodiments.

Example 1 may include a device comprising processing circuitry coupled to storage, the processing circuitry configured to: cause to send a null data packet (NDP) feedback report frame to one or more station devices, wherein the NDP feedback report frame comprises one or more feedback resource allocations; identify an allocation response on a first feedback resource allocation of the one or more feedback resource allocations from a first station device, wherein the first station device may be an unassociated station device; assign one or more uplink resource allocations as contention based resources based on the allocation response, wherein the one or more uplink resource allocations are to be used by the unassociated station device to send its uplink data; and cause to send an allocation frame comprising an indication of the one or more uplink resource allocations.

Example 2 may include the device of example 1 and/or some other example herein, wherein the NDP feedback report frame may be a trigger frame comprising a setting to indicate a polling type.

Example 3 may include the device of example 1 and/or some other example herein, wherein the allocation frame may be a trigger frame comprising a setting to indicate an allocation trigger frame.

Example 4 may include the device of example 1 and/or some other example herein, wherein the allocation response may be an energy transmitted on the first feedback resource allocation.

Example 5 may include the device of example 1 and/or some other example herein, wherein the one or more uplink resource allocations may be accessed using enhanced distributed channel access (EDCA).

Example 6 may include the device of example 1 and/or some other example herein, wherein the processing circuitry may be further configured to: identify a second allocation response, wherein the second allocation response may be detected as a second energy on the first feedback resource allocation, wherein the first energy and the second energy are added together as a resulting energy on the first feedback resource allocation.

Example 7 may include the device of example 1 and/or some other example herein, wherein the processing circuitry may be further configured to assign the one or more resource allocations based on the resulting energy on the resource allocation.

Example 8 may include the device of example 1 and/or some other example herein, wherein the processing circuitry may be further configured to determine to assign resource allocations to unassociated station devices at the end of the one or more uplink resource allocations.

Example 9 may include the device of example 1 and/or some other example herein, further comprising a transceiver configured to transmit and receive wireless signals.

Example 10 may include the device of example 9 and/or some other example herein, further comprising an antenna coupled to the transceiver.

Example 11 may include a non-transitory computer-readable medium storing computer-executable instructions which when executed by one or more processors result in performing operations comprising: causing to send a null data packet (NDP) feedback report frame to one or more station devices, wherein the NDP feedback report frame comprises one or more feedback resource allocations; identifying an allocation response on a first feedback resource allocation of the one or more feedback resource allocations from a first station device, wherein the first station device may be an unassociated station device; assigning one or more uplink resource allocations as contention based resources based on the allocation response, wherein the one or more uplink resource allocations are to be used by the unassociated station device to send its uplink data; and causing to send an allocation frame comprising an indication of the one or more uplink resource allocations.

Example 12 may include the non-transitory computer-readable medium of example 11 and/or some other example herein, wherein the NDP feedback report frame may be a trigger frame comprising a setting to indicate a polling type.

Example 13 may include the non-transitory computer-readable medium of example 11 and/or some other example herein, wherein the allocation frame may be a trigger frame comprising a setting to indicate an allocation trigger frame.

Example 14 may include the non-transitory computer-readable medium of example 11 and/or some other example herein, wherein the allocation response may be an energy transmitted on the first feedback resource allocation.

Example 15 may include the non-transitory computer-readable medium of example 11 and/or some other example herein, wherein the one or more uplink resource allocations may be accessed using enhanced distributed channel access (EDCA).

Example 16 may include the non-transitory computer-readable medium of example 11 and/or some other example herein, wherein the operations further comprise: identifying a second allocation response, wherein the second allocation response may be detected as a second energy on the first feedback resource allocation, wherein the first energy and the second energy are added together as a resulting energy on the first feedback resource allocation.

Example 17 may include the non-transitory computer-readable medium of example 11 and/or some other example herein, wherein the operations further comprise assigning the one or more resource allocations based on the resulting energy on the resource allocation.

Example 18 may include the non-transitory computer-readable medium of example 11 and/or some other example herein, wherein the operations further comprise determining to assign resource allocations to unassociated station devices at the end of the one or more uplink resource allocations.

Example 19 may include a method comprising: causing, by one or more processors, to send a null data packet (NDP) feedback report frame to one or more station devices, wherein the NDP feedback report frame comprises one or more feedback resource allocations; identifying an allocation response on a first feedback resource allocation of the one or more feedback resource allocations from a first station device, wherein the first station device may be an unassociated station device; assigning one or more uplink resource allocations as contention based resources based on the allocation response, wherein the one or more uplink resource allocations are to be used by the unassociated station device to send its uplink data; and causing to send an allocation frame comprising an indication of the one or more uplink resource allocations.

Example 20 may include the method of example 1 and/or some other example herein, wherein the NDP feedback report frame may be a trigger frame comprising a setting to indicate a polling type.

Example 21 may include one or more non-transitory computer-readable media comprising instructions to cause an electronic device, upon execution of the instructions by one or more processors of the electronic device, to perform one or more elements of a method described in or related to any of examples 1-20, or any other method or process described herein Example 22 may include an apparatus comprising logic, modules, and/or circuitry to perform one or more elements of a method described in or related to any of examples 1-20, or any other method or process described herein.

Example 23 may include a method, technique, or process as described in or related to any of examples 1-20, or portions or parts thereof.

Example 24 may include an apparatus comprising: one or more processors and one or more computer readable media comprising instructions that, when executed by the one or more processors, cause the one or more processors to perform the method, techniques, or process as described in or related to any of examples 1-20, or portions thereof.

Example 25 may include a method of communicating in a wireless network as shown and described herein.

Example 26 may include a system for providing wireless communication as shown and described herein.

Example 27 may include a device for providing wireless communication as shown and described herein.

Embodiments according to the invention are in particular disclosed in the attached claims directed to a method, a storage medium, a device, and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture, including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent, having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device, the device comprising processing circuitry coupled to storage, the processing circuitry configured to:
    cause to send a null data packet (NDP) feedback report frame to one or more station devices, wherein the NDP feedback report frame comprises one or more feedback resource allocations;
    identify an allocation response on a first feedback resource allocation of the one or more feedback resource allocations from a first station device, wherein the first station device is an unassociated station device, and based on receiving the NDP feedback report frame, the first station device transmits energy on at least one of the one or more feedback resource allocations to indicate its allocation response;
    calculate an amount of energy received on a single feedback resource allocation;
    determine based on the amount of energy being greater than a threshold that multiple unassociated devices transmitted energy using the same single feedback resource allocation;
    assign one or more uplink resource allocations as contention based resources based on the allocation response, wherein the one or more uplink resource allocations are to be used by the unassociated station device to send its uplink data; and cause to send an allocation frame comprising an indication of the one or more uplink resource allocations.

2. The device of claim 1, wherein the NDP feedback report frame is a trigger frame comprising a setting to indicate a polling type.

3. The device of claim 1, wherein the allocation frame is a trigger frame comprising a setting to indicate an allocation trigger frame.

4. The device of claim 1, wherein the allocation response is an energy transmitted on the first feedback resource allocation.

5. The device of claim 1, wherein the one or more uplink resource allocations may be accessed using enhanced distributed channel access (EDCA).

6. The device of claim 1, wherein the processing circuitry is further configured to:
identify a second allocation response, wherein the second allocation response is detected as a second energy on the first feedback resource allocation, wherein the first energy and the second energy are added together as a resulting energy on the first feedback resource allocation.

7. The device of claim 1, wherein the processing circuitry is further configured to assign the one or more resource allocations based on the resulting energy on the resource allocation.

8. The device of claim 1, wherein the processing circuitry is further configured to determine to assign resource allocations to unassociated station devices at the end of the one or more uplink resource allocations.

9. The device of claim 1, further comprising a transceiver configured to transmit and receive wireless signals.

10. The device of claim 9, further comprising an antenna coupled to the transceiver.

11. A non-transitory computer-readable medium storing computer-executable instructions which when executed by one or more processors result in performing operations comprising:
causing to send a null data packet (NDP) feedback report frame to one or more station devices, wherein the NDP feedback report frame comprises one or more feedback resource allocations;
identifying an allocation response on a first feedback resource allocation of the one or more feedback resource allocations from a first station device, wherein the first station device is an unassociated station device, and based on receiving the NDP feedback report frame, the first station device transmits energy on at least one of the one or more feedback resource allocations to indicate its allocation response;
calculating an amount of energy received on a single feedback resource allocation;
determining based on the amount of energy being greater than a threshold that multiple unassociated devices transmitted energy on the same single feedback resource allocation;
assigning one or more uplink resource allocations as contention based resources based on the allocation response, wherein the one or more uplink resource allocations are to be used by the unassociated station device to send its uplink data; and causing to send an allocation frame comprising an indication of the one or more uplink resource allocations.

12. The non-transitory computer-readable medium of claim 11, wherein the NDP feedback report frame is a trigger frame comprising a setting to indicate a polling type.

13. The non-transitory computer-readable medium of claim 11, wherein the allocation frame is a trigger frame comprising a setting to indicate an allocation trigger frame.

14. The non-transitory computer-readable medium of claim 11, wherein the allocation response is an energy transmitted on the first feedback resource allocation.

15. The non-transitory computer-readable medium of claim 11, wherein the one or more uplink resource allocations may be accessed using enhanced distributed channel access (EDCA).

16. The non-transitory computer-readable medium of claim 11, wherein the operations further comprise:
identifying a second allocation response, wherein the second allocation response is detected as a second energy on the first feedback resource allocation, wherein the first energy and the second energy are added together as a resulting energy on the first feedback resource allocation.

17. The non-transitory computer-readable medium of claim 11, wherein the operations further comprise assigning the one or more resource allocations based on the resulting energy on the resource allocation.

18. The non-transitory computer-readable medium of claim 11, wherein the operations further comprise determining to assign resource allocations to unassociated station devices at the end of the one or more uplink resource allocations.

19. A method comprising:
causing, by one or more processors, to send a null data packet (NDP) feedback report frame to one or more station devices, wherein the NDP feedback report frame comprises one or more feedback resource allocations;
identifying an allocation response on a first feedback resource allocation of the one or more feedback resource allocations from a first station device, wherein the first station device is an unassociated station device, and based on receiving the NDP feedback report frame, the first station device transmits energy on at least one of the one or more feedback resource allocations to indicate its allocation response;
calculating an amount of energy received on a single feedback resource allocation;
determining based on the amount of energy being greater than a threshold that multiple unassociated devices transmitted energy on the same single feedback resource allocation;
assigning one or more uplink resource allocations as contention based resources based on the allocation response, wherein the one or more uplink resource allocations are to be used by the unassociated station device to send its uplink data; and
causing to send an allocation frame comprising an indication of the one or more uplink resource allocations.

20. The method of claim 1, wherein the NDP feedback report frame is a trigger frame comprising a setting to indicate a polling type.

* * * * *